United States Patent Office 3,505,400
Patented Apr. 7, 1970

3,505,400
PROCESS FOR THE PRODUCTION
OF ACETIC ACID
Walter Kronig and Wulf Schwerdtel, Leverkusen, Germany, assignors to Farbenfabriken Bayer Aktiengesellschaft, Leverkusen, Germany, a corporation of Germany
No Drawing. Filed May 24, 1967, Ser. No. 640,813
Claims priority, application Germany, June 1, 1966,
F 49,363
Int. Cl. C07c 53/08, 51/24
U.S. Cl. 260—541
10 Claims

ABSTRACT OF THE DISCLOSURE

Improvements in the production of acetic acid by the oxidation of sec.-butyl acetate with an oxygen-containing gas in the liquid phase at 150 to 250° C. and 50 to 150 atmospheres pressure with an oxygen to sec.-butyl acetate mol ratio of at least 2 to 1, which improvements include cooling the oxidation product to room temperature without releasing the pressure, separating the liquid and gas resulting from such cooling without releasing the pressure and then heating the cooled gas to about 150 to 600° C. before relieving the pressure on such gas.

---

This invention relates to a process for the production of acetic acid.

It is known that acetic acid can be produced by converting n-butenes into sec.-butyl acetate by treatment with acetic acid in the presence of acid ion exchangers, and after removal of the catalyst and any unreacted $C_4$-hydrocarbons still present converting the reaction product thus obtained, consisting of sec.-butyl acetate and, optionally, excess acetic acid, into acetic acid by oxidising it in the liquid phase with oxygen, optionally in the presence of oxidation catalysts. In this case, the gas mixture used for oxidation still contains oxygen, preferably 0.5% to 5% by volume, after leaving the reaction vessel (cf. French patent specification No. 1,384,207). That portion of the acetic acid formed which is required for reacting the n-butenes with acetic acid to give sec.-butyl acetate may be recycled.

If the oxygen used for oxidation is in the form of air, it is advisable subsequently to remove as much as possible of the residual inert gas. The residual gas is thus relieved of pressure. In this connection, it is basically desirable to use the pressure energy of the gas to be relieved of pressure, for example in turbines, to compress the fresh air required for the reaction. Unfortunately, one disadvantage affecting this process is that the gas to be relieved of pressure contains vapours of carboxylic acids which have a strongly corrosive effect on the turbines. It is particularly troublesome, however, that the marked cooling which occurs when the gases are relieved of pressure causes any water and carboxylic acids entrained to crystallise out and to obstruct the pressure-relieving systems, for example turbines.

We have now found that the process for the production of acetic acid by reacting 1 mol of sec.-butyl acetate, preferably obtained in a first process stage as known per se by the addition of acetic acid to n-butenes, with at least 2 mols of oxygen or gases containing oxygen, in the liquid phase at a temperature of from 150° C. to 250° C., optionally in the presence of an oxidation catalyst and optionally in the presence of acetic acid, under such reaction conditions that the residual gas still contains excess oxygen, provides particularly good results if the product formed during oxidation is cooled to around room temperature without being relieved of pressure, the liquid components are separated off and the residual gas left behind is heated to from 150° C. to 600° C. by catalytic post-combustion before it is relieved of pressure.

The process according to the invention may be carried out, for example, as follows:

The sec.-butyl acetate is oxidised by selecting the reaction conditions and/or the ratio between the starting material and the air used in such a way that the residual waste gas contains, for example, around 1% to 8% by volume of oxygen. The reaction products leaving the reactor in which oxidation is carried out are cooled to around room temperature, for example 15° C. to 30° C., without being relieved of pressure, and are separated in a separator, in which a level is maintained, into gas on the one hand and liquid reaction products on the other hand. According to the invention, the gases thus obtained may be further treated as follows. Apart from the oxygen, the waste gas also contains certain quantities of carbon monoxide emanating from the oxidation reaction, usually between 1% and 4% by volume. As already mentioned, the gas also contains relatively small quantities of carboxylic acid vapours. This gas is then subjected to catalytic combustion, still under pressure, for which purpose the gas is advantageously passed through a reactor filled with a fixed oxidation catalyst. Although the gas can be introduced into the oxidation reactor at room temperature, it is of greater advantage initially to heat the gas to around 100° C.–200° C., whether by the supply of outside energy or, with greater advantage, by heat-exchange with some of the post-combustion gas. It is possible in this way to relieve the pressure on the gas in the turbine without any interruptions, the energy thus released being utilised to compress the fresh air. There are no corrosion problems because during the catalytic oxidation reaction the carboxylic acids are burnt to give carbon dioxide and water. Another advantage of utilising the combustion energy of the combustible constituents in the waste gas is that the waste gas enters the turbine at a relatively high temperature, thus considerably improving the efficiency of the turbine itself. It has proved to be of advantage to allow the waste gas to flow into the turbine at a temperature of 150° C. to 600° C., advantageously at a temperature of from 350° C. to 550° C.

Another advantage of this procedure is that the carbon monoxide present in the waste gas is also burnt to give carbon dioxide so that the gas flowing out into the atmosphere is substantially free of carbon monoxide.

In the production of the acetic acid, relatively small quantities of formic acid are also formed during oxidation of the butyl acetate. There is generally no point in purifying these small quantities of formic acid to the level required for chemical use. We have found that it is of great advantage to introduce all or some of the crude formic acid obtained when the oxidation products are worked up into the waste gas before its catalytic combustion in order thus also to utilise the combustion energy of the formic acid for raising the temperature of the waste gas. This method of eliminating the formic acid is of particular advantage insofar as special apparatus would otherwise have to be used to destroy the crude formic acid which does not have any commercial value. In this way, the process as a whole provides acetic acid as the main product and carbon dioxide and steam as secondary products in the waste gas, apart from small quantities of fairly high boiling products as a distillation residue, in addition to which the combustion energy of the original secondary products is used very simply to improve the economy of the process.

Basically, any conventional oxidation catalyst such as, for example, catalysts based on cobalt, vanadium, copper, silver manganese and chromium may be used as a post-combustion catalyst. Noble metals, platinum and palladium in particular, on supports have provided to be particularly suitable. Suitable supports for the oxidation catalysts include, for example, those containing aluminium oxide or its derivatives such as, for example, spinels or silica. In one preferred embodiment, supports with specific surfaces of 5 to 50 m.$^2$/g. are used.

It has proved to be of particular advantage to wash the waste gas from the production of the acetic acid with a solvent, preferably acetic acid, at the reaction pressure and at a temperature around room temperature, after the liquid oxidation products have been separated therefrom i.e. before it enters the after burning stage. In this way, the mists frequently present in the waste gas are removed therefrom, as are above all the more readily volatile products such as butyl acetate and intermediate oxidation products, for example methylethyl ketone and acetaldehyde. The tail product of distillation in which the low-boiling intermediate oxidation products and the unreacted butyl acetate have been distilled off from the product of oxidation for recycling into the oxidation reactor may be used e.g. for scrubbing. The acetic acid leaving the scrubber together with the intermediate products is advantageously returned to the aforementioned distillation column, in which case the intermediate oxidation products removed from the waste gas are recycled to the oxidation stage as tail products of distillation. The scrubber waste gas then only contains that quantity of acetic acid which corresponds to the vapour pressure.

The liquid reaction products which are present in the reaction product emanating from oxidation of the sec.-butyl acetate and which were separated from the gases to be treated in accordance with the invention in the separator mentioned above are relieved of pressure, liberating the gaseous reaction products (carbon dioxide and carbon monoxide) dissolved therein. Low-boiling intermediate oxidation products and any unreacted sec.-butyl acetate are distilled off from the reaction product, advantageously in the presence of steam which, following condensation, is returned to the distillation stage, and are advantageously recycled to the reactor. That portion of the acetic acid left as a distillation residue which is required to produce the sec.-butyl acetate may be directly recycled. If necessary, any water left is removed from the acetic acid by distillation before it is recycled. If the acetic acid is not recycled, it is converted into commercial form e.g. by distillation or refining.

As shown in the parent patent, the process for the production of acetic acid may be carried out, for example, as follows:

The butyl acetate required for the oxidation reaction may be produced, conventionally for example, by reacting an n-butene with acetic acid in the presence of a catalyst, e.g., an acid cation exchanger; it is of advantage for this purpose to use at least 1 mol and preferably 2 mols of acetic acid per mol of n-butene. One variation of this procedure used to produce the butyl acetate is now described:

The $C_4$-starting material should consist of n-butenes, optionally in admixture with butanes or even other less reactive hydrocarbons. The i-butene content should be as low as possible, advantageously, 1% by weight or even less.

The acetic acid used for the formation of esters from the n-butenes in the first stage of the reaction is preferably a concentrated acetic acid, for example, glacial acetic acid.

The n-butene is esterified with the acetic acid in the presence of an acid catalyst, for example with the assistance of mineral acids such as sulphuric acid, hydrofluoric acid or phosphoric acid, or even with a fixed catalyst such as, for example, acid-activated fuller's earth or a catalyst containing tungstic acid. It has proved to be of particular advantage to carry out the esterification reaction in the presence of a cation exchanger, advantageously a conventional cation exchanger containing sulphonic acid groups obtained by the polymerisation or copolymerisation of aromatic vinyl compounds followed by sulphonation. Examples of aromatic vinyl compounds suitable for use in the preparation of the polymers or copolymers include styrene, vinyl toluenes, vinyl naphthalenes, vinylethyl benzenes, methyl styrenes, vinyl chlorobenzenes and vinyl xylenes. Various methods may be used to produce these polymers such as, for example, polymerisation either on its own or in admixture with other monovinyl compounds, and cross-linking with polyvinyl compounds such as, for example, divinyl benzenes, divinyl toluenes, divinylphenylvinyl ethers and several others. The polymers may be prepared in the presence or the absence of solvents or dispersants, and in the presence of various polymerisation initiators such as, for example, inorganic or organic peroxides and persulphates.

The sulphonic acid group may be introduced into these aromatic vinyl polymers by the various methods known for this purpose, for example, by sulphonating the polymers with concentrated sulphuric acid or chlorosulphonic acid, or in some cases even by copolymerising copolymerisable aromatic compounds containing sulphonic acid groups, cf., for example, U.S. patent specification No. 2,366,007. In addition, other sulphonic acid groups may be introduced into these polymers already containing sulphonic acid groups by treating them with oleum, i.e., sulphuric acid containing sulphur trioxide. The oleum treatment is preferably carried out at from 0° C. to 150° C., the sulphur trioxide content of the sulphuric acid being preferably such that, on completion of sulphonation, the sulphonated material still contains from 10% to 50% of free sulphur trioxide. The products obtained preferably contain an average of from 1.3 to 1.8 sulphonic acid groups per aromatic nucleus. Copolymers containing sulphonic acid groups of aromatic monovinyl compounds with aromatic polyvinyl compounds, divinyl compounds in particular, in which the polyvinyl benzene component preferably makes up from 1% to 20% by weight of the copolymer, are particularly suitable for the process according to the invention (cf. for example, German patent specification No. 908,247).

It is of advantage to use fine-grained ion exchangers for example ion exchangers with a grain size of from $0.1\mu$ to $50\mu$, preferably $0.5\mu$ to $30\mu$.

To carry out the liquid-phase esterification reaction, the reactants, i.e., for example, the butene/butane fraction and the acetic acid are mixed together to form a homogeneous solution. Butenes and acetic acid may be used in equimolar quantities. However, it has proved to be of greater advantage for the present purpose to use an excess of acetic acid, for example, 2 mols of acetic acid per mol of butene. The mixture of reactants is introduced into the reaction vessel in which the catalyst, for example, an acid cation exchanger is present in suspension e.g., in concentrations of from 1% to 20% by weight, advantageously from 5% to 15% by weight.

The contents of the reactor are kept thoroughly intermixed by stirring, pumping or other measures. The reaction can be carried out, for example, at a temperature of from 80° C. to 120° C., advantageously at a temperature of from 100° C. to 110° C. The vapour pressure settles at around 10 atms. although it is possible to use higher pressures, for example, pressures of 20 atms. and above, by introducing inert gases under pressure. In general, average residence times of from around 30 minutes to 3 hours, advantageously from 1 to 1½ hours, will be sufficient. The reaction may be carried out in batches although it is of greater advantage to work continuously and to feed the reactants through one or more reactors arranged one behind the other. On completion of the reaction, the catalyst is separated out from the reaction mixture which, in the case of the solid cation exchanger, for example, may be done by sedimentation, filtration or centrifuging. Separation by centrifuging under pressure is particularly effective. If, after this, finely divided catalyst is still present in the clarified product of centrifuging (top fraction), it can be removed by subsequent fine filtration. The residue from centrifuging (bottom fraction) is recycled to the reactors.

The activity of the catalyst deteriorates somewhat over a period of time so that some of the catalyst is periodically removed from the circuit and replaced by fresh catalyst.

Any unconverted $C_4$-hydrocarbons may then be removed from the now catalyst-free reaction mixture, preferably by distillation.

The reaction mixture free of the $C_4$-hydrocarbons is then introduced as a starting material into the oxidation stage, in which case the molar ratio of sec.-butyl acetate to acetic acid may be between 1:0 and 1:10. This oxidation reaction is advantageously carried out with gaseous oxygen in the liquid phase by passing the starting material through a reactor together with a gas containing oxygen, for which purpose it is preferred to use vertical reaction tubes through which the reactants flow in an upward stream although other systems may of course be used. To dissipate the heat of reaction, cooling units, for example, may be provided in the reactor. The oxidation reaction is advantageously carried out in the absence of catalysts, although conventional oxidation catalysts such as cobalt acetate, manganese acetate and chromium acetate may even be used. It has proved to be of advantage to recycle some of the reaction product to the inlet end of the reactor so as to accelerate the start of the reaction. Such recycling can be carried out with particular advantage by allowing some back-mixing in the reactor. The oxidation reaction itself can be carried out at a temperature of from 150° C. to 250° C., preferably at a temperature of from 160° C. to 200° C., and at a pressure of from 30 to 150 atms., advantageously at a pressure of from 40 to 70 atms. Air may be used as the oxidizing agent. 1 mol of sec.-butyl acetate is reacted with at least 2 mols of oxygen, this ratio and the reaction conditions being adapted to one another in such a way that, at the end of the reaction zone, the concentration of oxygen in the gas amounts to from 0.5% to 5% by volume. Around 20% to 70%, and advantageously from 30% to 50%, of the inflowing sec.-butyl acetate can be reacted in a single run through the reactor.

The oxidation reaction can be carried out to particular advantage if the heat liberated during oxidation of the butyl acetate is absorbed in the reaction product and some of the reaction product is recycled to the reactor through a cooling unit. The process may be carried out for example as follows: A vertical or horizontal pressure vessel largely free of fittings, cooling units in particular, i.e. an almost empty vessel, is used for the oxidation reaction. The product free of solids and $C_4$-hydrocarbons emanating from the aforementioned reaction of n-butene with acetic acid to sec.-butyl acetate, a product which consists essentially of sec.-butyl acetate and acetic acid, is introduced as a reactant at the lower end of the reaction vessel. Products from the oxidation stage, i.e. the unconverted butyl acetate accumulating during working-up of the oxidation products by distillation and the intermediate products of oxidation, are added as additional reactants to this starting material for the oxidation reaction. Oxygen, advantageously in the form of compressed air or even other oxygen containing gas mixtures, is introduced into the oxidation vessel as a further reactant. The gases used for the oxidation reaction are introduced into the reaction vessel in fine distribution whether through a relatively large number of single nozzles or through frits or other suitable distributing means. The reaction vessel is filled with liquid through which the finely divided reaction gas ascends. The reaction products and residual reaction gas leave the reactor at its upper end. The reactants issuing at the upper end of the reactor (reaction product and residual reaction gas) are transferred to a separator in which a constant level is maintained by means of an overflow tube. Liquid reaction product is carried off through the overflow pipe in a quantity corresponding to the freshly introduced liquid material, together with the residual reaction gas. This mixture is cooled, usually at room temperature, and transferred to another separator in which the reaction gas and liquid reaction product are separated from one another. Liquid reaction product is run off from the lower part of the first separator and passed through a waste-heat boiler in which the product gives off the quantity of heat it absorbed in the reactor through the heat of the oxidation reaction. Water is advantageously used to absorb the heat through the pipes or tubes of the waste-heat boiler, thus producing the steam required for the distillations, for example. The product leaving the waste-heat boiler at its lower end is recycled to the lower end of the reactor. It is also possible, for example, to carry out the separation in the first separator in the upper part of the reactor itself, in which case gas is prevented from flowing into the waste heat boiler, preferably by the provision of baffles. In the waste-heat boiler, the temperature of the circulating reaction product is lowered back to the level suitable for entry into the reactor. The quantity of reaction product cycled between the reactor and the waste-heat boiler is between 50 and 150 times, and advantageously between 75 and 125 times, the quantity introduced into the reactor as a liquid starting material, i.e. the sum of the product from the butyl acetate formation and recycled products from the distillation of the oxidation stage. The reaction product can be circulated by suitable mechanical systems, for example propellors or rotary pumps arranged in the circuit, for example, beneath the waste heat boiler. Nevertheless, it has been found that, in cases where tower-like reactors are used, the difference in density between the gas-permeated contents of the reactor and the gas-free circulating liquid is usually sufficient to maintain circulation. In this case, the heat of reaction can be dissipated and utilised to particular advantage. By using an approximately 100-fold liquid circuit to absorb the heat of reaction given off in the reactor and then to release it again in the waste-heat boiler, it is possible to keep the rise in temperature in the reactor within limits, for example 5° C. to 20° C., which do not have any appreciable effect on the course of the reaction. Reactor inlet temperatures of from 180° C. to 210° C., for example, are suitable. The pressures used are advantageously between 40 and 70 atms. It is possible by virtue of this method, in which the reaction products are extensively recycled through the waste heat boiler, to work with large throughputs and, for example, to obtain fresh acetic acid in quantities of from 200 to 500 g./hour litre of reaction volume, without any undesirable temperature increases in the reactor.

The sequence of butyl acetate production and oxidation may also be used to produce secondary butyl acetate from n-butenes by removing part of the secondary butyl acetate produced before the reaction product is introduced into the oxidation stage. The butyl acetate is preferably separated from the acetic acid by distillation with steam.

The invention is illustrated by the following examples.

EXAMPLE 1

(a) In the process for the production of acetic acid described below under (b), a waste gas containing the following uncondensable components was formed under a pressure of 60 atms.:

4.5% by volume of carbon dioxide
2.0% by volume of carbon monoxide
5.0% by volume of oxygen
88.5% by volume of nitrogen The gas also contained 12 g./Nm.$^3$ of organic compounds, partly in mist form. The compounds in question were acetic acid, formic acid, butyl acetate, methylethyl ketone, acetaldehyde and other intermediate oxidation products. This gas had a temperature of 20° C. and was passed at this temperature through a packed column or tower in which the gas was scrubbed with acetic acid. The washing solution was recycled in the lower part of the tower. The fresh acetic acid was introduced at the upper end of the scrubber in quantities of 100 g. per 1 Nm.$^3$ of waste gas to be scrubbed. The waste gas leaving the scrubber had an organic substance content (almost exclusively acetic acid) of 1 g./Nm.$^3$.

The washed gas was heated to 150° C. by heat-exchange with hot waste gas from the post-combustion reactor. Directly before its entry into the reactor, crude formic acid obtained by separating the reaction product from the acetic acid plant was injected into this gas. This crude formic acid had the following composition:

75% by weight of formic acid
15% by weight of acetic acid
5% by weight of butyl acetate and intermediate oxidation products
5% by weight of water The crude formic acid was introduced in a proportion of 10 g. per 1 Nm.$^3$ of gas. The gas flowed in a descending stream through the reactor filled with the oxidation catalyst. 0.05% of palladium on 4-mm. chips of a mixture of 90 parts of aluminium oxide and 10 parts of bentonite the surface of which had been adjusted by heating at 1300° C. to 10 m.$^2$/g. was used as the catalyst. Above the catalyst, there was a layer of clay beads to facilitate evaporation of the crude formic acid introduced. The catalyst was used in a quantity of 40 cm.$^3$ per Nm.$^3$ of gas to be treated. The gas left the reactor at a temperature of 520° C. It was free of carbon monoxide and organic substances and, apart from nitrogen, oxygen and water vapour, only contained carbon dioxide. Some of this waste gas was used to heat the entering gas, all the waste gas being introduced into the turbine in which it was relieved of pressure, producing energy.

(b) The waste gas described at (a) above was obtained as follows:

A C$_4$-fraction was used to form the butyl acetate. It came from the pyrolysis of petroleum hydrocarbons. The butadiene in the C$_4$-fraction obtained from the pyrolysis products was initially extracted with a solution of a copper salt in ammonia. The i-butene was then converted into diisobutene/triisobutene with the aid of acid cation exchangers. The C$_4$-fraction thus obtained had the following composition:

| | Percent by weight |
|---|---|
| Butanes | 18.0 |
| i-Butene | 0.4 |
| n-Butenes | 81.6 |
| | 100.0 |

3.4 kg./hour of the preheated C$_4$-hydrocarbons and 6.5 kg./hour of acetic acid were introduced into a 33-litre capacity agitation vessel. 3 kg. of catalyst were suspended in the liquid contents of the reactor. This catalyst was an acid cation exchanger consisting of a polystyrene resin which has been cross-linked with 8% of divinyl benzene and subsequently monosulphonated. Its grain size was in the range of from 1μ to 50μ. The catalyst was retained in the vessel by a filter candle. The reaction conditions were: pressure=20 atms., temperature=110° C. The liquid, catalyst-free product was run off through a condenser and relieved of pressure. The unreacted hydrocarbon gas was distilled off in a subsequent separator at 60° C.–70° C. in normal pressure. The flow rates were 0.92 kg./hour of gas and 8.8 kg./hour of liquid reaction mixture. The gas had the following composition:

| | Percent by weight |
|---|---|
| Butanes | 51.1 |
| n-Butenes | 48.9 |
| | 100.0 |

8.8 kg./hour of reaction product from the first stage (free of catalyst and C$_4$-hydrocarbons) were used as a fresh starting material for the oxidation reaction. It consisted of:

53.5% by weight of acetic acid
43.0% by weight of butyl acetate, and
3.5% by weight of by-products 6.2 kg./hour of products emanating from the working-up by distillation of the oxidation products were also introduced together with this product from stage 1. These 6.2 kg. consisted of 75% by weight of sec.-butyl acetate (unreacted) 20% by weight of low-boiling oxidation products, 2% by weight of acetic acid and 3% by weight of water.

15 kg. of this mixture were heated to 200° C. in a heater and introduced into the lower end of a tower reactor 4150 mm. long and 45 mm. in diameter, corresponding to a reaction volume of 6.6 litres. 12 Nm.$^3$ of air were also introduced into the lower end of the reactor under a pressure of 60 atms., being distributed on single nozzles. The butyl acetate was then converted mainly into acetic acid during the passage through the reactor, consuming the oxygen introduced with the air. The reactants issuing from the upper end of the reactor flowed into a separator in which a certain level was adjusted. 1500 kg. of liquid reaction product were run off from the lower end of the hot separator, passed downwards through the waste-heat boiler and fed into the lower end of the reactor. The mixture of reaction product and reaction gas issuing from the overflow pipe was passed through a condenser into a separator in which a certain level was maintained.

The liquid product (16.5 kg.) was relieved of pressure through a valve and then worked up by distillation. The 16.5 kg. of reaction product consisted of:

53% by weight of acetic acid,
30% by weight of sec.-butyl acetate,
11% by weight of secondary products, and
6% by weight of water.

The quantity of acetic acid produced per litre of reaction volume amounted to 350 g./litre.

The 16.5 kg. of reaction product were separated in a distillation column into 7.1 kg. of head product and 9.4 kg. of tail product. The head product was divided in a separator into two layers, namely a 0.9 kg. aqueous layer and a 6.2 kg. organic layer which was returned to the oxidation reaction. The tail product was fed to another distillation in which 7.0 kg. of head product were removed and re-used for butyl acetate formation. The 2.4 kg. left at the bottom of the distillation column were separated by another distillation into 2.3 kg. of pure acetic acid and 0.1 kg. of higher boiling products.

The waste-gas under the reaction pressure was treated in accordance with Example 1a.

EXAMPLE 2

Acetic acid was introduced into the 4150 mm.-long, 45-mm. diameter reactor described in Example 1b. 25.7 Nm.$^3$ of air/hour were introduced at the lower end of the reactor under a pressure of 60 atms. A gas separator at the top of the reactor was used for separation into gas and liquid phases. Of the liquid phase, a quantity of 1200 litres per hour was returned downwards through the waste-heat boiler to the lower end of the reactor. The reactor was then externally heated, 9 kg./hour of commercial sec.-butyl acetate (heated to 180° C.) being introduced at the lower end at a temperature of 195° C. The external heating was then switched off. The liquid product overflowing from the gas separator was cooled together with the gases and separated in a second separator. The liquid phase was worked up by distillation giving 7.64 kg./hour of acetic acid, 1.8 kg./hour of unreacted sec.-butyl acetate, 0.60 kg./hour of intermediate oxidation products and 1.29 kg./hour of water. The gas leaving the cold separator was scrubbed at 20° C. in a scrubbing tower with pure acetic acid from the working up of the liquid reaction product, without being relieved of pressure. The acetic acid thus charged was returned to the distillation stage for the oxidation products. In this way, a residual gas was obtained which was shown by analysis to have the following composition:

Percent by volume:
- $CO_2$—4.3
- CO—3.1
- $O_2$—4.3

Apart from the quantity of acetic acid corresponding to the vapour pressure, the gas did not contain any other organic compounds.

This residual gas was then heated in exchange with hot combustion gases and passed under full pressure over 1 litre of catalyst arranged in a 45-mm. diameter tubular reactor. The catalyst had the following composition: 50% of manganese dioxide, 30% of copper oxide, 15% of cobalt oxide and 5% of silver oxide.

In order to raise the temperature of the gases leaving the post-combustion apparatus to 600° C., 170 g./hour of $C_4$-hydrocarbons were added (mixture of 50% of butane and 50% of butene). The waste gas could thus be relieved of pressure in a turbine without any danger of freezing. It was completely free of CO and organic impurities.

What we claim is:

1. In the process of producing acetic acid by reacting, in the liquid phase at about 150 to 250° and about 50 to 150 atmospheres pressure, sec-butyl acetate and a gas comprising oxygen wherein the oxygen and sec-butyl acetate are present in a mol ratio of at least 2 to 1; the improvement which comprises cooling the product of said reaction to about room temperature without relieving the pressure thereon; separating the liquid and residual gas remaining upon said cooling without relieving the pressure; heating said cooled residual gas, in the presence of at least one oxidation catalyst selected from the group consisting of cobalt, vanadium, copper, silver, manganese, chromium, platinum, and palladium without relieving the pressure, to about 150 to 600° C.; and then relieving the pressure thereon.

2. Improved process claimed in claim 1 wherein said oxidation catalyst is utilized on a support.

3. Improved process as claimed in claim 2, wherein said catalyst is at least one noble metal.

4. Improved process as claimed in claim 2, wherein said support is a member selected from the group consisting of aluminum oxide, spinels and silica.

5. Improved process as claimed in claim 1 wherein the cooled separated residual gas is washed with a solvent before heating.

6. Improved process claimed in claim 5 wherein said solvent is acetic acid.

7. Improved process as claimed in claim 1 wherein said post combustion catalyst is a fixed bed.

8. Improved process claimed in claim 1 wherein said cooled, separated residual gas is preheated by indirect heat exchange with gas leaving said gas heating step.

9. Improved process claimed in claim 1 wherein liquid by-products of said acetic acid production are recycled and added to said cooled residual gas prior to heating such.

10. Improved process claimed in claim 1, wherein said cooled residual gas contains about 1 to 8 volume percent of oxygen prior to heating such.

References Cited

UNITED STATES PATENTS

| | | | |
|---|---|---|---|
| 2,800,506 | 7/1957 | Millidge et al. | 260—533 |
| 3,362,987 | 1/1968 | Kronig et al. | 260—497 |

LORRAINE A. WEINBERGER, Primary Examiner

V. GARNER, Assistant Examiner

U.S. Cl. X.R.

260—497, 542